May 19, 1931. R. M. ADAMSON 1,805,750
AUTOMATICALLY CONTROLLED AIRPLANE
Filed Jan. 21, 1929 2 Sheets-Sheet 2
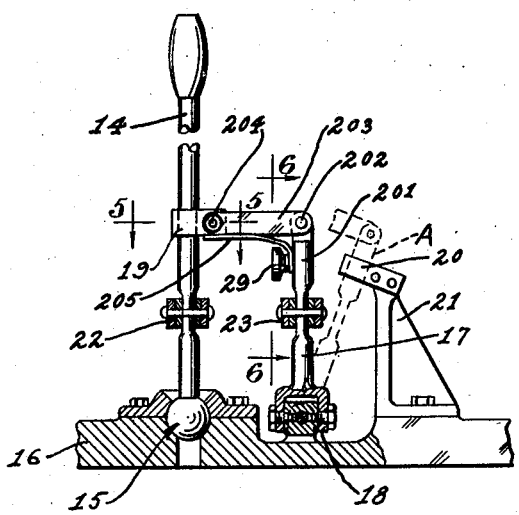
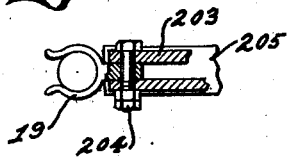
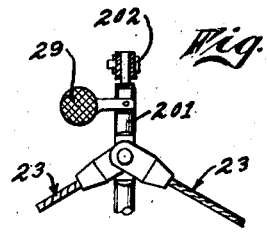
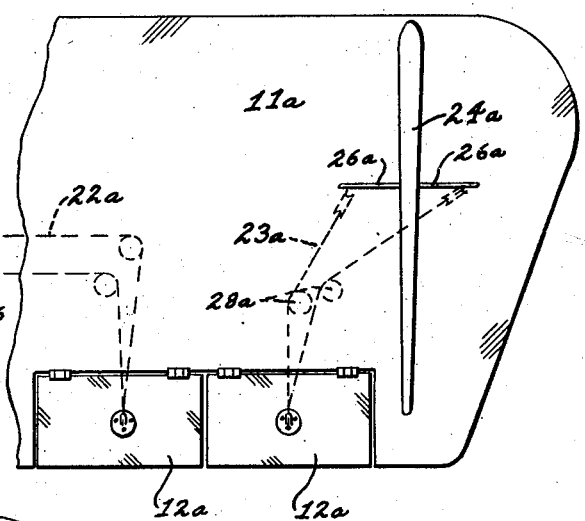
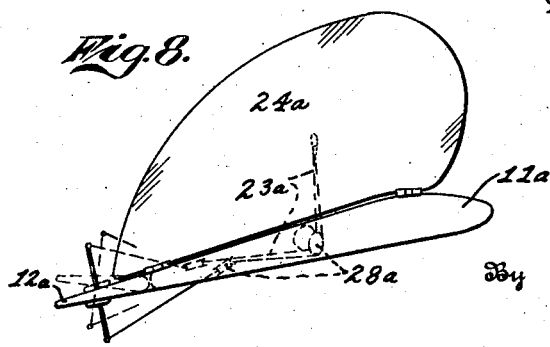
Inventor
Robert M. Adamson
By Lyon & Lyon
Attorneys Patented May 19, 1931

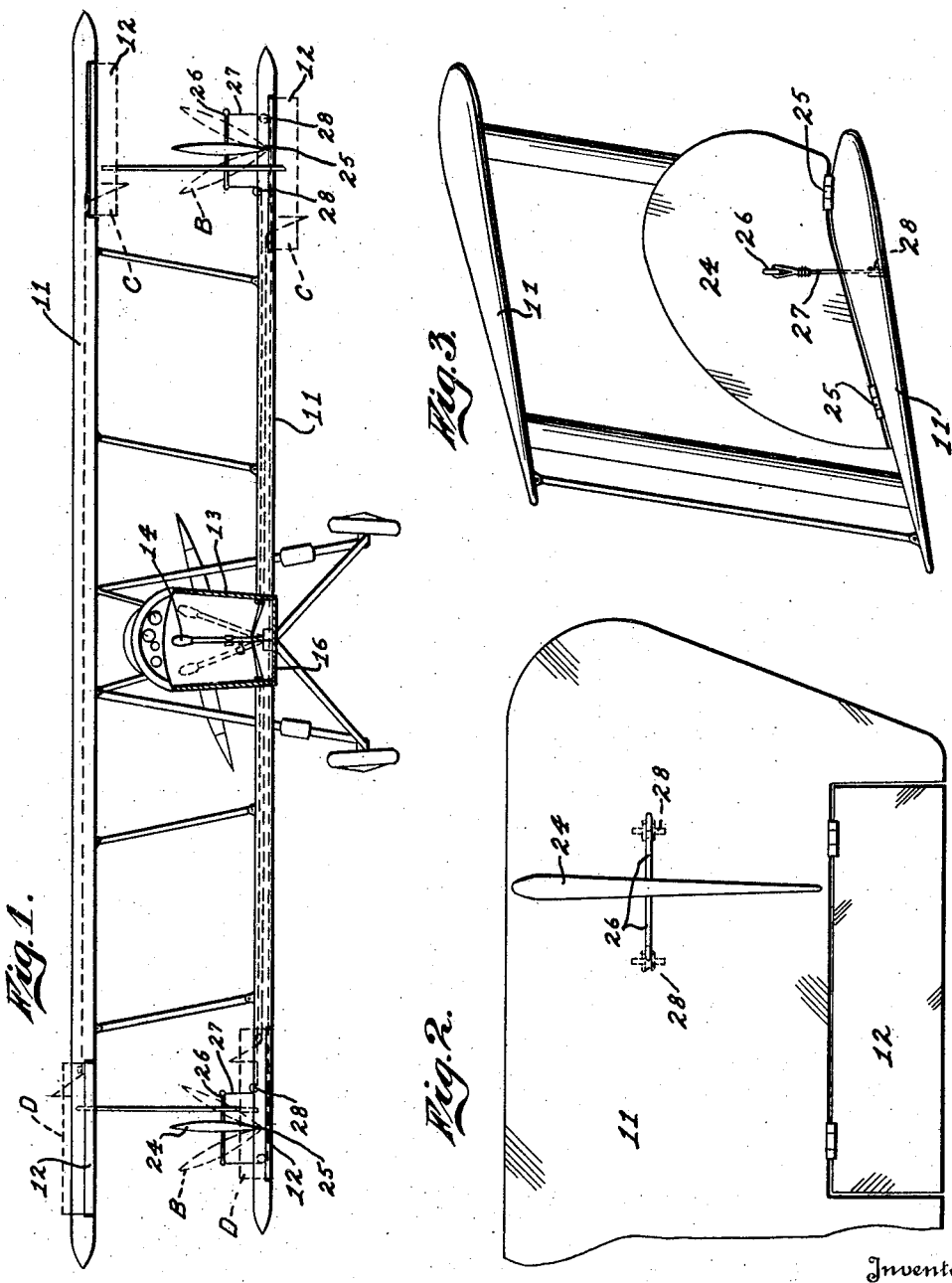

1,805,750

UNITED STATES PATENT OFFICE

ROBERT M. ADAMSON, OF LOS ANGELES, CALIFORNIA

AUTOMATICALLY CONTROLLED AIRPLANE

Application filed January 21, 1929. Serial No. 333,911.

This invention relates to automatically controlled airplanes and, more especially, to automatic aileron control.

An object of the invention is to provide simple and effective means for automatic control of at least some of the ailerons of an airplane by the movements of fins which, in turn, are deflected by an air pressure differential.

Though it is not new to employ fins that are deflected by unequal air pressures on opposite sides thereof, I have utilized such fins in a different manner and, thereby, have considerably simplified the connections between the fins and the ailerons.

The accompanying drawings illustrate the invention.

Figure 1 is a rear elevation of an automatically controlled airplane, the fuselage being shown in section. Some of the parts are shown in one position in solid lines and in other positions in broken lines.

Figure 2 is an enlarged fragmental plan view of the outer end portion of the lower right hand wing in Figure 1.

Figure 3 is an end elevation of Figure 2 from the right thereof.

Figure 4 is an enlarged detail view, partly in section, of the manual control and portions of the automatic control.

Figure 5 is a horizontal section on the line indicated by 5—5, Figure 4.

Figure 6 is a view, partly in section, from the line indicated by 6—6, Figure 4.

Figure 7 is a plan view similar to Figure 2 showing a modified form of the invention.

Figure 8 is an end view of Figure 7 from the right thereof, one of the ailerons being shown in one position in solid lines and in other positions in broken lines.

Figure 9 is a diagrammatic view illustrating the fins, ailerons and control connections as used for the form of the invention illustrated in Figure 1.

First describing the form of the invention illustrated in Figures 1 to 6 inclusive, the airplane comprises any desired number of wings or airfoils 11. In this instance there are two wings 11, an upper one and a lower one. Each of the wings is provided near its opposite ends with ailerons 12. This construction is quite common and, therefore, need not be described in detail.

The fuselage is indicated at 13, the wing structure extending therefrom, and within the fuselage is movably mounted a joy-stick 14 whereby the ailerons may be manually controlled, if it should be so desired. The joy-stick 14 has a ball and socket mounting 15 in the floor 16 of the fuselage so as to permit said joy-stick to be moved fore and aft for elevator control and laterally for aileron and rudder control. The elevator and rudder connections are not illustrated, as they are well understood in this art.

Mounted in fore and aft alignment with the joy-stick 14 is an arm 17 which has a pin universal joint 18 for mounting said arm in the floor 16. The arm 17 is inverted L-shape and at its free end is provided with a spring forked grip 19 adapted to engage the joy-stick 14 according as the arm 17 is moved to the left or to the right in Figure 4, the right-hand position being indicated in broken lines A. When the arm 17 is in the position A, it is maintained against lateral movement by a spring forked clamp 20 of the same construction as the clamp 19, said clamp 20 being mounted on the upper end of a standard 21 secured to the floor 16.

In this instance, the arm 17 comprises an upright member 201 pivoted at 202 to a link 203 which, in turn, is pivoted at 204 to the clamp 19 so that fore and aft movement of the arm 17 will be properly transmitted to the joy-stick 14, without tilting the clamp 19 relative to the joy-stick. In order to support the clamp 19 and link 203 in proper position so that the clamp 19 will engage the joy-stick 14 at right angles to said joy-stick, when the arm 17 and the joy-stick 14 are vertical, there is attached to the member 201 a spring 205 that extends beneath the link 203 and the clamp 19. When the joy-stick is moved to the left and right, in Figure 4, the spring 205 will yield so as to permit of the link 203 and clamp 19 moving downwardly in the arc that they describe when such movements take place.

The joy-stick 14 is connected by connections 22 with the ailerons 12, in a manner well understood in this art, so that, when the arm 17 is disengaged from the joy-stick 14, manual control of the ailerons is possible. The arm 17 is connected by connections 23 with fins 24 which, in this instance, are movably mounted on the lower wing 11, near the outer ends of said wing. The fins 24 are hinged at 25 on the upper surface of the lower wing and the connections 23 are secured, approximately, to the central portions of the fins. The connections 23 consist in part of arms 26 projecting from opposite faces of the fins and in part of cables 27 connected to the outer ends of the arms 26. The cables 27 pass into the structure of the lower wing and around pulleys 28. The connections 22, 23, ailerons 12, fins 24, arm 17 and joy-stick 14 are mutually related in a manner that when the fins 24 are in vertical position the ailerons 12 will be in the planes of the wings with which said ailerons are associated.

To facilitate operation of the arm 17 into its different positions, by the foot of the aviator, said arm 17 is provided near its upper end with a laterally projecting operating member 29 which may be engaged by the toe of the aviator, either to force the arm 17 to the right in Figure 4 into engagement with the clamp 20, or to the left so that the clamp 19 will engage the joy-stick.

The form of the invention just described operates as follows: Assuming that the flight of the airplane is such as occurs when the ailerons are in the planes of their respective wings, with the fins 24 vertical, that the arm 17 is engaged with the joy-stick 14, and that for some reason or other the wings tend to side-slip to the right in Figure 1, the air pressure against the fins 24 will be increased against the right side thereof in Figure 1, thus deflecting them to the left as indicated by broken lines B. This pulls on the connections 23 so as to deflect the ailerons 12 on the right to the positions indicated at C, and raise the ailerons on the left to the positions indicated at D, thereby increasing the pressure beneath the right ends of the wings so as to counteract the side-slip. If the side-slip is to the left in Figure 1, the fins will operate to deflect the ailerons on the left and raise the ailerons on the right.

If the aviator desires to assume manual control of the ailerons, he will disengage the arm 17 from the joy-stick 14, thrusting said arm 17 into engagement with the clamp 20, thereby maintaining the fins in their vertical positions, and he can then operate the ailerons by manipulating the joy-stick 14 in a manner well understood in this art.

Now describing the modified form of the invention illustrated in Figures 7 and 8, the elements that are the functional equivalents of those hereinbefore described are indicated by the same reference characters with the addition of the letter $a$. In this instance, the wing is provided near each end with a pair of ailerons $12^a$ and one of the ailerons $12^a$ of each pair is connected by connections $22^a$ with the joy-stick, not shown, and the other aileron of each pair is connected by the connections $23^a$ to the fins $24^a$. Thus, manual control is had of one set of ailerons and the other set of ailerons is automatically controlled by the fins in the manner hereinbefore described. In the form of the invention illustrated in Figures 1 to 6, inclusive, the aviator can alternate from manual control to automatic control, whereas in the form of the invention illustrated in Figures 7 and 8, there is automatic control which may be supplemented by manual control.

*Stabilizing action in straight flight*

In normal flight the stabilizing action is as follows: If a gust of wind should strike the left wing, thereby causing an increase lift of the left wing, the plane will have a tendency to slip to the right and in so doing it applies pressure on the right side of the right fin and the right side of the left fin; this increases the lift of the right wing which balances the temporary increase lift of the left wing. In other words, the effect of the gust of wind striking one wing is equalized by this device, giving the same result as though the gust had simultaneously struck both wings. This will make for smoother flying and will remove considerable strain on the pilot.

This stabilizing action is secured by the form of the invention illustrated in Figure 1, when the arm 17 is connected with the joy-stick 14 and, also, by the form of the invention illustrated in Figure 7, when the joy-stick is secured in neutral position so as to hold the ailerons, to which said joy-stick is connected, in the plane of the wing.

*As side wind and drift compensator*

In a fog, the bank and turn indicator will enable the pilot to keep his ship from turning and keep it level, but does not enable him to detect cross wind. This device automatically takes care of the cross wind as long as the pilot operates the rudder properly. Suppose the pilot is flying due north and a cross wind is blowing from the west, this causes the plane to drift in a northeasterly direction or, rather, it would were it not for the action of these fins. The cross wind exerts pressure on the windward side of the fins, which increases the lift of the left wing by automatically dropping the left aileron and the plane will assume a right bank, this being detected by the pilot on the bank indicator, and he will apply left rudder. This will cause a tendency of the plane to skid to the right and its nose will point slightly northwesterly. This will exert sufficient pressure on the leeward or opposite sides of the fins to equalize the pressure exerted on the windward side by the cross wind. This procedure will tend to head the plane into the wind in a northwesterly direction until the pressure is equal on both sides of the fins. When the pressures are the same, the plane will be headed into the wind enough to prevent any drift and the ship will fly in an exact northerly course. This makes the rudder control the only control necessary for the pilot to fly the ship in a direct course.

The hook-up illustrated in Figures 1 and 9 may be used on a plane in which it may be desirable to use the automatic control only at times, and when the automatic control is kicked into center position the plane may have full maneuverability. If the flyer were flying blind or in a fog, the control might be used and, also, if the flyer were sketching maps the ship would fly itself with the automatic control operating. I would advise this hook-up for transports in which it might be necessary to assist the automatic control when the plane is heavily loaded. This would be ideal for commercial transports where gradual turns are nearly always used. It would make flying very smooth and would add to the comfort of the passengers.

The hook-up illustrated in Figures 7 and 8 may be used on student training planes and the student will have full control of the plane, but the automatic control will teach him not to over-control and will teach him the proper amount of bank for turns of different radii and for different speeds of the ship. It will also make it safer for students because they cannot put the airplane into a side-slip.

A hook-up like that illustrated in Figures 7 and 8, but omitting the connections 22ª and their connected ailerons, may be used at a later time, when the device has been tried out more fully and proven to the aviation experts and pilots that it will work to perfection, and when they have placed their confidence in it.

This device may be used on any type of plane. These fins on the wings will also increase the efficiency of the wings by cutting down the vortex loss of the wings.

I claim:

1. An automatically controlled airplane comprising a wing, fins movably mounted on the end portions of the wing, ailerons adjustably connected with the wing, and connections between the fins and ailerons, said connections including a joy-stick.

2. An automatically controlled airplane comprising a wing, fins movably mounted on the end portions of the wing, ailerons adjustably connected with the wing, and connections between the fins and ailerons, said connections including a joy-stick, and a movably mounted arm provided with a clamp to engage the joy-stick.

3. An automatically controlled airplane comprising a wing, fins movably mounted on the end portions of the wing, ailerons adjustably connected with the wing, a joy-stick, connections between the joy-stick and ailerons, a movably mounted arm provided with a clamp to engage the joy-stick, and connections between said arm and the fins.

4. An automatically controlled airplane comprising a wing, fins movably mounted on the end portions of the wing, ailerons adjustably connected with the wing, a joy-stick, connections between the joy-stick and the ailerons, a movably mounted arm provided with a clamp to engage the joy-stick, a means to releasably hold the arm when said arm is disengaged from the joy-stick, and connections between said arm and the fins.

5. An automatically controlled airplane comprising a wing, fins movably mounted on the end portions of the wing, a pair of ailerons adjustably connected with each end portion of the wing, manual control means for one of the ailerons of each pair, and independent connections respectively between the other ailerons and the associated fins.

6. An automatically controlled airplane comprising a wing, fins movably mounted on the end portions of the wing, ailerons adjustably connected with the wing, a joy-stick, connections between the joy-stick and ailerons, and means releasably connecting each of the fins with the joy-stick.

7. An automatically controlled airplane comprising a wing, fins movably mounted on the end portions of the wing, ailerons movably mounted on the wing, a means to manually control the ailerons, and a means releasably connecting the fins with the first mentioned means.

8. An automatically controlled airplane comprising a wing, fins movably mounted on the end portions of the wing, ailerons movably mounted on the wing, a means to manually control some of the ailerons, and means operable by independent movement of the fins to control each of the other ailerons independently of each other.

9. An automatically controlled airplane comprising a wing, ailerons movably mounted on the wing, fins mounted to extend fore and aft with respect to the wing and to tilt toward and from the ends of the wing, and means operable by tilting of the fins toward one end of the wing to raise the aileron associated with said end and to deflect the aileron associated with the opposite end of said wing, said means including a manual control member.

10. An automatically controlled airplane comprising a wing, fins movably connected with the wing, ailerons adjustably connected with the wing, and connections between the fins and ailerons, said connections including a joy-stick.

11. An automatically controlled airplane comprising a wing, fins movably connected with the wing, ailerons adjustably connected with the wing, and connections between the fins and ailerons, said connections including a manual control member.

12. An automatically controlled airplane comprising a wing, fins movably connected with the wing, ailerons adjustably connected with the wing, connections between the fins and ailerons, said connections including a manual control member and including a member releasably connected with said manual control member.

13. An automatically controlled airplane comprising a wing, fins movably connected with the wing, ailerons adjustably connected with the wing, connections between the fins and the ailerons, said connections including a manual control member and including a movably mounted member detachably connected with said manual control member.

14. An automatically controlled airplane comprising a wing, fins hingedly connected in upright position to the wing so as to rock longitudinally of the wing, ailerons movably connected with the wing, and connections between the fins and the ailerons, said connections including a manual control member.

15. An automatically controlled airplane comprising a wing, a fin movably connected with the wing, ailerons adjustably connected with the wing, and connections between the fin and ailerons, said connections including a manual control member.

Signed at Los Angeles, California, this 5th day of January, 1929.

ROBERT M. ADAMSON.